(12) United States Patent
Koncelik, Jr.

(10) Patent No.: US 6,564,696 B2
(45) Date of Patent: May 20, 2003

(54) DISPLAY DEVICE FOR BEVERAGE PITCHER OR COFFEE MACHINE

(76) Inventor: Lawrence J. Koncelik, Jr., 10 Gingerbread La., East Hampton, NY (US) 11937

( * ) Notice: Subject to any disclaimer, the term of this patent is extended or adjusted under 35 U.S.C. 154(b) by 0 days.

(21) Appl. No.: 09/967,544

(22) Filed: Oct. 1, 2001

(65) Prior Publication Data

US 2002/0020300 A1 Feb. 21, 2002

(51) Int. Cl.[7] .................... A47J 31/00; G01K 1/08; G01K 1/14
(52) U.S. Cl. ............... 99/285; 99/323.3; 116/201; 116/323; 116/279; 116/DIG. 1; 116/DIG. 3; 40/444; 40/445
(58) Field of Search ................. 99/285, 280, 281, 99/282, 283, 323.3; 220/592.16, 592.2, 592.28; 116/323, 321, 201, 279, DIG. 1, DIG. 3; D7/322, 397, 398, 393; 40/442, 444, 445

(56) References Cited

U.S. PATENT DOCUMENTS

| 490,164 A | 1/1893 | Ready |
| 4,794,877 A | 1/1989 | Pollard-Smith .............. 116/323 |
| 5,094,153 A * | 3/1992 | Helbling ....................... 99/280 |
| 5,509,349 A * | 4/1996 | Anderson et al. .......... 99/323.1 |
| D404,250 S | 1/1999 | Midden et al. .............. D7/397 |
| 6,431,054 B1 * | 8/2002 | Reid ........................... 99/285 |

* cited by examiner

Primary Examiner—Reginald L. Alexander
(74) Attorney, Agent, or Firm—Walter J. Tencza, Jr.

(57) ABSTRACT

An apparatus is disclosed comprising a display device. The apparatus may also be comprised of a beverage pitcher onto which the display device can be placed. The display device can be placed in a first or a second state. In the first state the display device provides a first visual indication of a first type of beverage which is within the beverage pitcher. In the second state the display device provides a second visual indication of a second type of beverage which is within the beverage pitcher. The display device may be comprised of a sliding member for allowing or preventing a first or a second designation for a first or a second type of beverage to be displayed. The beverage pitcher in one embodiment is a coffee pot. The first type of beverage may be decaffeinated coffee and the second type of beverage may be caffeinated or regular coffee. In other embodiments, a coffee machine includes an indicator device which indicates whether coffee is decaffeinated or not.

22 Claims, 10 Drawing Sheets

DISPLAY DEVICE FOR BEVERAGE PITCHER OR COFFEE MACHINE

FIELD OF THE INVENTION

This invention relates to improved methods and apparatus concerning providing signs or symbols to indicate the contents of beverage pitchers.

BACKGROUND OF THE INVENTION

Typically in the prior art an individual serving coffee for themselves from someone else's coffee pot or pitcher does not know whether the coffee is regular coffee, i.e. non-decaffeinated, or decaffeinated coffee. Typically the only way to find out is to ask the individual who made the coffee which may be inconvenient, difficult or not possible. In commercial settings, coffee houses may place regular or non-decaffeinated coffee in, for example, a red colored pitcher or red colored coffee pot and decaffeinated coffee in a differently colored pot, such as a blue colored pitcher or blue colored coffee pot. At a residence an individual may have to go through the inconvenience of posting a sign or post it note to indicate whether the coffee is non decaffeinated or decaffeinated.

SUMMARY OF THE INVENTION

The present invention in one or more embodiments discloses an apparatus comprising a beverage pitcher and a display device. The display device can be placed in a first state or a second state. In the first state the display device provides a first visual indication of a first type of beverage which is within the beverage pitcher. In the second state the display device provides a second visual indication of a second type of beverage which is within the beverage pitcher. The first and second type of beverages differ and the first and second visual indications differ.

The display device may be comprised of a sliding member which is connected to the beverage pitcher and which can be slid to a first position to allow a first designation of the first type of beverage to be seen and which in the first position covers and prevents from being seen a second designation of the second type of beverage. The sliding member may also be slid into a second position to allow a second designation of the second type of beverage to be seen and which in the second position covers and prevents from being seen the first designation of the first type of beverage.

The beverage pitcher in one embodiment is a coffee pot. Pitcher is a broad term, which includes for example, a decanter or a thermos. The first type of beverage may be decaffeinated coffee and the second type of beverage may be non decaffeinated or regular coffee. The first and second designations of the first and second type of beverages may each be comprised of least one alphanumeric character.

The present invention also discloses a method comprising the steps of fixing a display device onto a beverage pitcher wherein the display device can be placed into the first state or the second state previously described.

The present invention in various embodiments allows one to determine whether or not the contents of a single pot, or a single decanter contains non-decaffeinated coffee or decaffeinated coffee.

DETAILED DESCRIPTION OF THE DRAWINGS

Figure 1:
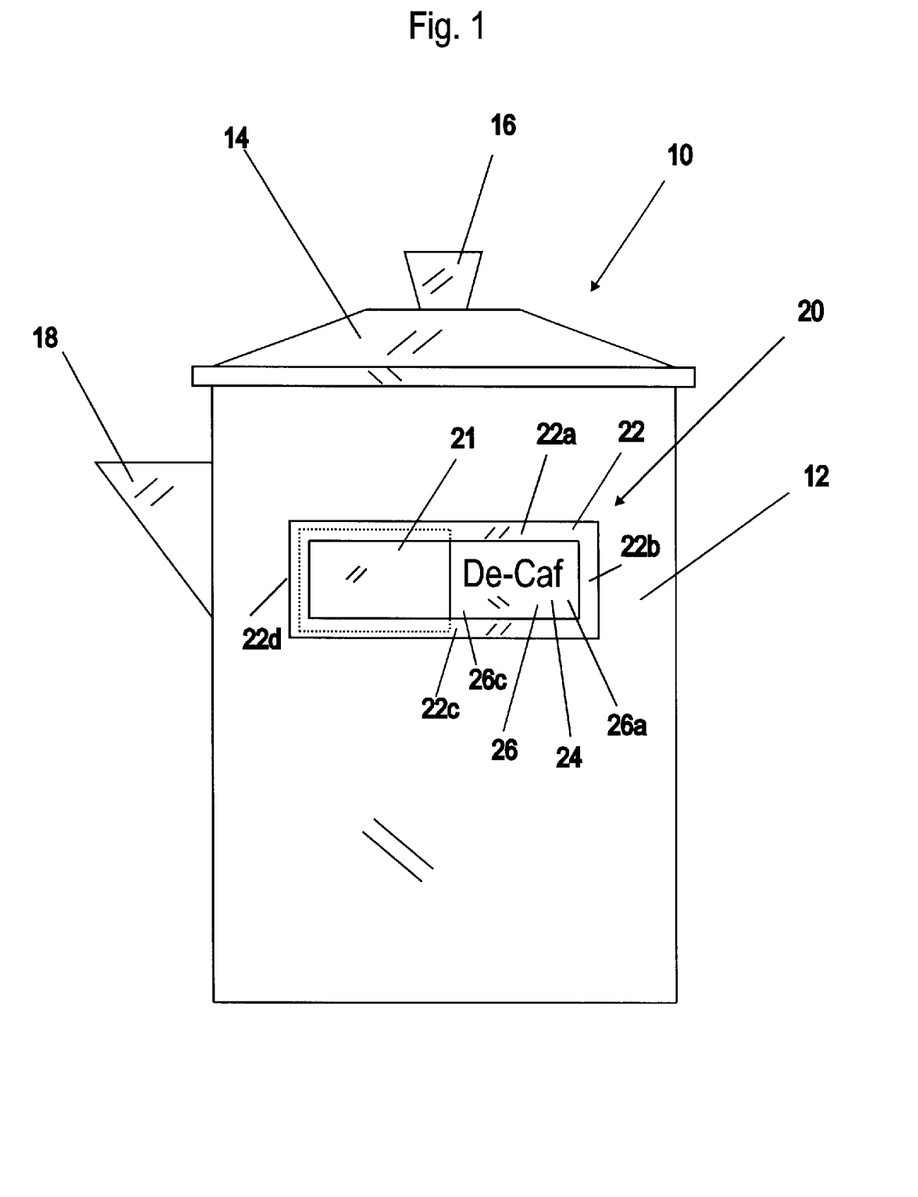
FIG. 1 shows a coffee pot with a display device in a first state to indicate a first type of coffee in the coffee pot in accordance with a first embodiment of the present invention.

FIG. 1 shows a beverage pitcher 10 which may be a coffee pot with a display device 20 in a first state to indicate a first type of coffee in the beverage pitcher 10 in accordance with a first embodiment of the present invention. Pitcher is a broad term which includes, for example a decanter or a thermos. In the example of FIG. 1, the first type of coffee is decaffeinated coffee. A designation 24 in alphanumeric characters of "De-Caf" is shown as a designation, symbol, or indication, to specify that decaffeinated coffee is in the beverage pitcher 10. The beverage pitcher 10 is also comprised of a receptacle portion 12 for storing coffee or other liquid beverage, a lid 14 having a handle 16, and a spout 18.

Figure 2:
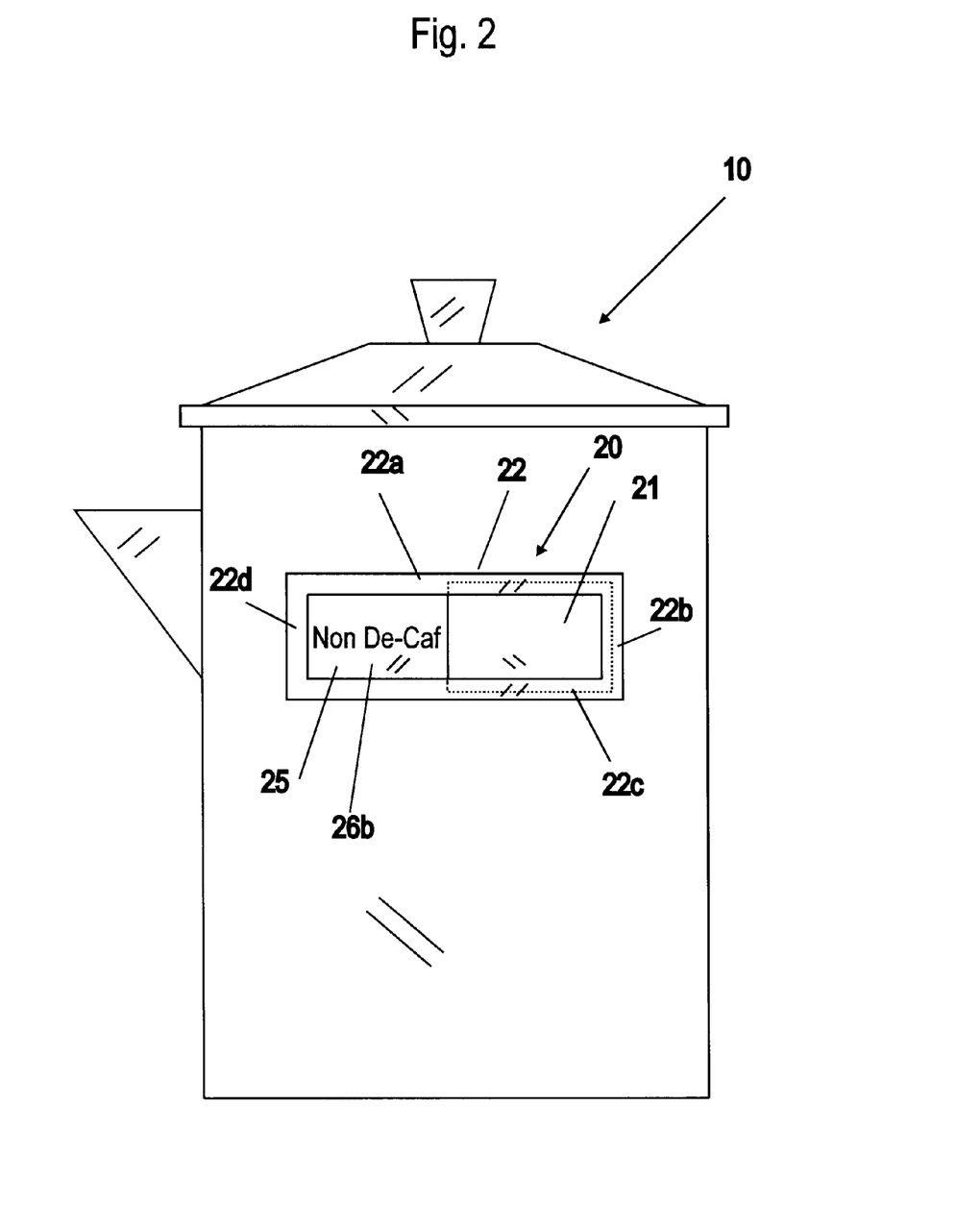
FIG. 2 shows the coffee pot and the display device of FIG. 1 with the display device in a second state to indicate a second type of coffee in the coffee pot in accordance with a first embodiment of the present invention.

The display device 20 is comprised of a sliding member 21. The sliding member 21 should be opaque so that it covers whatever area it is located over. The display device 20 is also comprised of frame or 22, which includes portions or borders 22a, 22b, 22c, and 22d. The sliding member 21 can slide within frame 22 from a first state or position shown in FIG. 1 to a second state or position shown in FIG. 2. The portion 22d contacts and prevents the sliding member 21 from sliding any further to the left from the first state shown in FIG. 1. The portion 22b contacts and prevents the sliding member 21 from sliding any further to the right from the second state of FIG. 2. The portion 22c keeps the sliding member 21 from falling downwards and the portion 22a keeps the sliding member 21 from moving upwards. In this manner the sliding member 21 is connected to attached to the beverage pitcher 10. Each of the portions or borders 22a–d may have a channel which allow the sliding member 21 to slide underneath a portion of the borders 22a–d but which do not allow the sliding member 21 to become separated from the beverage pitcher 10. Each of the portions or borders 22a-d may be fixed to a front side 26c of a backing 26 which may be attached to the beverage pitcher 10 such as by gluing or in a detachable adhesive manner, or in any other known manner.

The display device 20 may be sold or provided separately from the pitcher 10. The display device 20 may have a backing 26 with a front side 26c (shown in FIG. 1) and a back side 26d (shown in FIG. 10). On the back side 26d of the backing 26 may be placed an adhesive for attaching or detaching the display device 20 from the pitcher 10. The portions 22a–d, the backing 26, and the sliding member 21 may be integrated together to form the display device 20.

In operation a person, which may be the person who made coffee which is contained in receptacle 12, may place the display device 20 in a first state to indicate that decaffeinated coffee is in the beverage pitcher 10. In this first state, shown in FIG. 1, the designation 24 "De-Caf" can be seen. This can be called a first visual indication of a first type of beverage within the beverage pitcher. The designation 24 "De-Caf" may be printed on a portion 26a of the backing 26. In the first state, the designation 25 "Non De-Caf" (shown in FIG. 2) is covered by the opaque sliding member 21 which has been slid completely to the left in FIG. 1.

An individual may change the display device into a second state to indicate non decaffeinated coffee is in the beverage pitcher 10. The individual would slide the sliding member 21 from the position in FIG. 1 to the position in FIG. 2. The edges of the sliding member 21 underneath the frame 22 are shown by dashed lines in FIGS. 1 and 2. In the second state of FIG. 2, the sliding member 21 has been slid as far to the right as it can be slid, until it contacts portion 22b of the frame 22. The sliding member 21 now covers the designation 24 for "De-Caf" and the designation 25 for "Non De-Caf" can be seen. This can be called a second visual indication of a second type of beverage within the beverage pitcher. The designation 25 for "Non De-Caf" is printed on a portion 26b of the backing 26. The backing 26 may be a material such as plastic or hard cardboard.

The display device 20 may take on other forms which would be apparent to those skilled in the art. Other liquids could be placed in the beverage pitcher 10. The display device 20 in that case may indicate whether there is one type of beverage or another type of beverage in the pitcher 10, and the beverages would not be limited to coffee.

Figure 3:
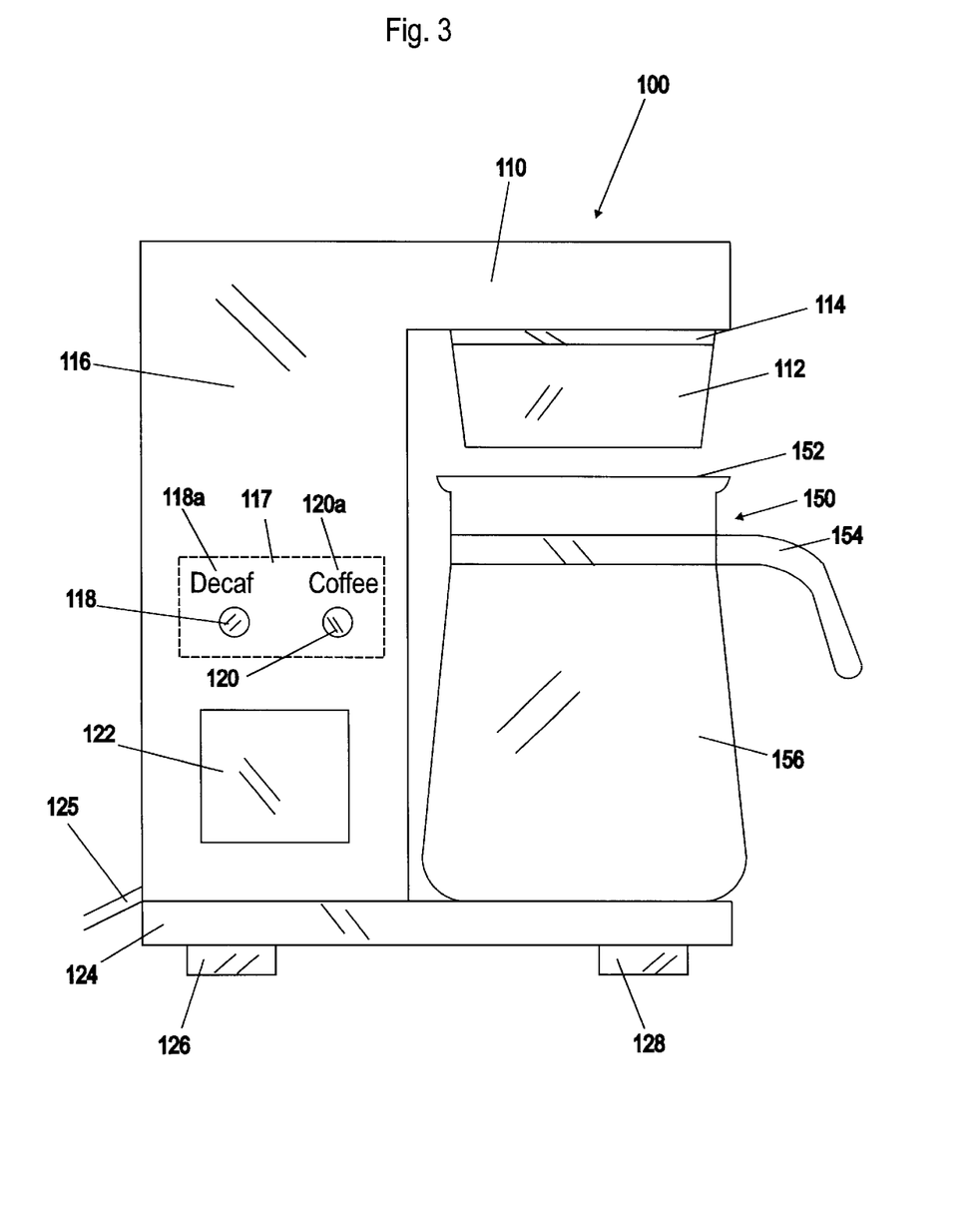
FIG. 3 shows a coffee machine in accordance with another embodiment of the present invention including an indicator or display device showing a light under a designation to indicate whether coffee which has been prepared in a coffee pot is regular or decaffeinated.

FIG. 3 shows a coffee machine 100 in accordance with another embodiment of the present invention including an indicator device 117. The coffee machine 100 includes an extension 110, portions 112, 114, 116, indicator device 118, control panel 122, power cord 125 (shown partially) which may be electrically connected to a power outlet, base 124, and legs 126 and 128. The coffee machine 100 may be identical to known available coffee machines, such as "Mr. Coffee" (Trademarked) except for the indicator device 117. FIG. 3 also shows a coffee pot 150 having an opening 152 for receiving coffee from the coffee machine 100, a handle 154 and a receptacle 156 in which the coffee is stored.

The indicator device 117 includes push button lights 118 and 120 which are under designation "Decaf" 118a and "Coffee" 120a respectively. The push button lights 118 and 120 are both toggle switches and as such if they are turned off, they will light up when pushed, and if they are turned on, they will turn off when pushed in. If an individual has made decaffeinated coffee in the coffee pot 150 they may cause the push button light 118 to light and cause the push button light 120 to stay off. Thus light 118 is lit under designation 118a for "Decaf". If an individual has made regular coffee in the coffee pot 150 they may cause the push button light 120 to turn off and cause the push button light 118 to stay on. Thus light 120 is lit under designation 118a for "Coffee". In this way, any person who wants to have a cup of coffee from the coffee pot 150 will know whether it is coffee (i.e. regular non-decaffeinated coffee) or decaffeinated coffee.

Figure 4:
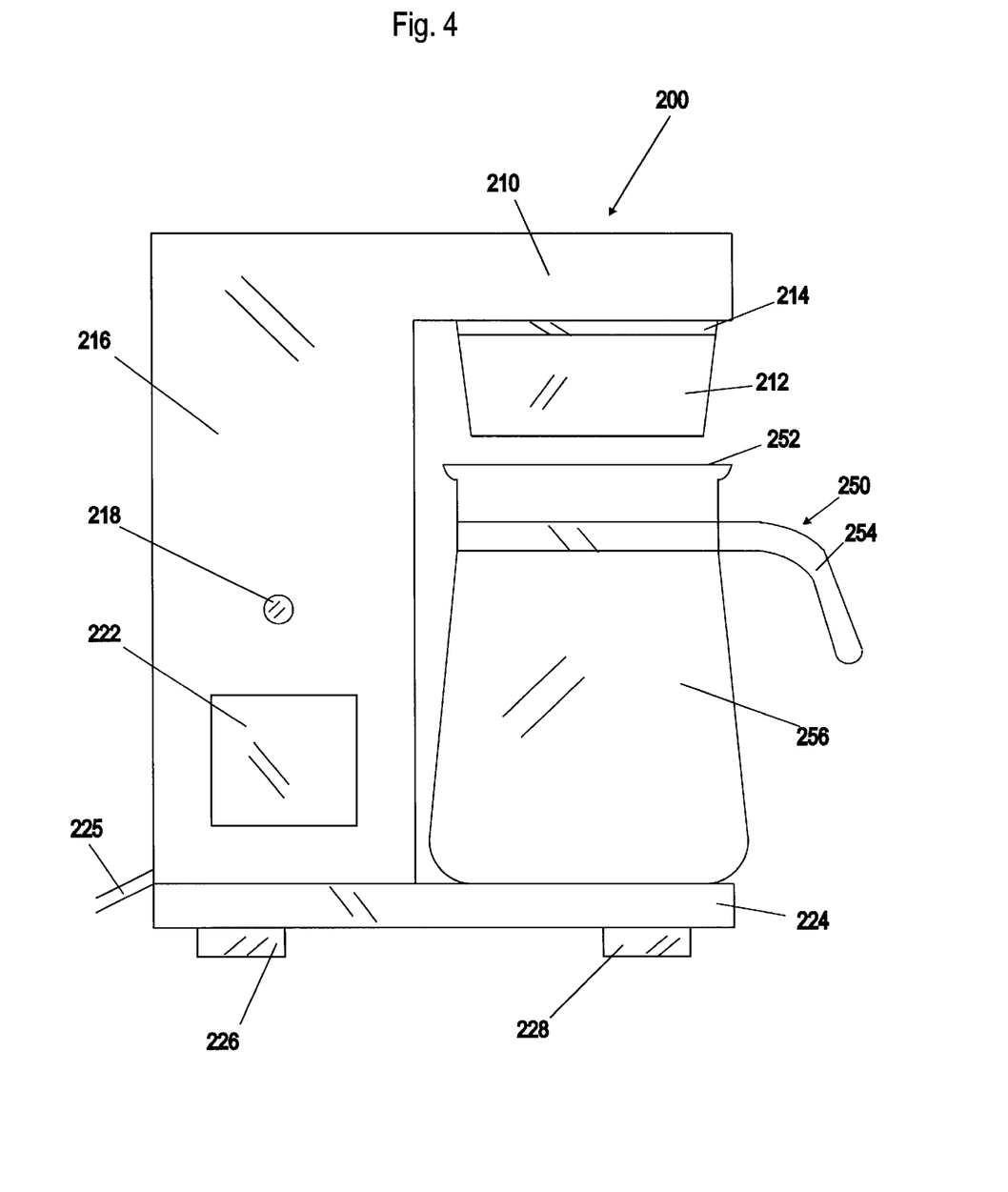
FIG. 4 shows a coffee machine in accordance with another embodiment of the present invention including an indicator or display device showing only a light, which may be one of two colors, to indicate whether coffee which has been prepared in a coffee pot is regular or decaffeinated.

FIG. 4 shows a coffee machine 200 in accordance with another embodiment of the present invention including an indicator device 218 which is only a light in this example and which may emit one of two colors, to indicate whether coffee which has been prepared in a coffee pot 250 is regular or decaffeinated. The coffee machine 200 may be identical to coffee machine 100 except to the difference between indicator device 117 and indicator device 218. Coffee machine 200 includes an extension 210, portions 212, 214, 216, indicator device 218, control panel 222, power cord 225 (shown partially) which may be electrically connected to a power outlet, base 224, and legs 226 and 228. FIG. 4 also shows a coffee pot 250 having an opening 252 for receiving coffee from the coffee machine 200, a handle 254 and a receptacle 256 in which the coffee is stored.

The indicator device 218 is a push button single light which can be toggled to emit either a green color light or a red color light. An individual can use, for example, green to indicate that Decaffeinated coffee has been made in coffee pot 250 and red to indicate that regular coffee has been made in coffee pot 250.

Figure 5:
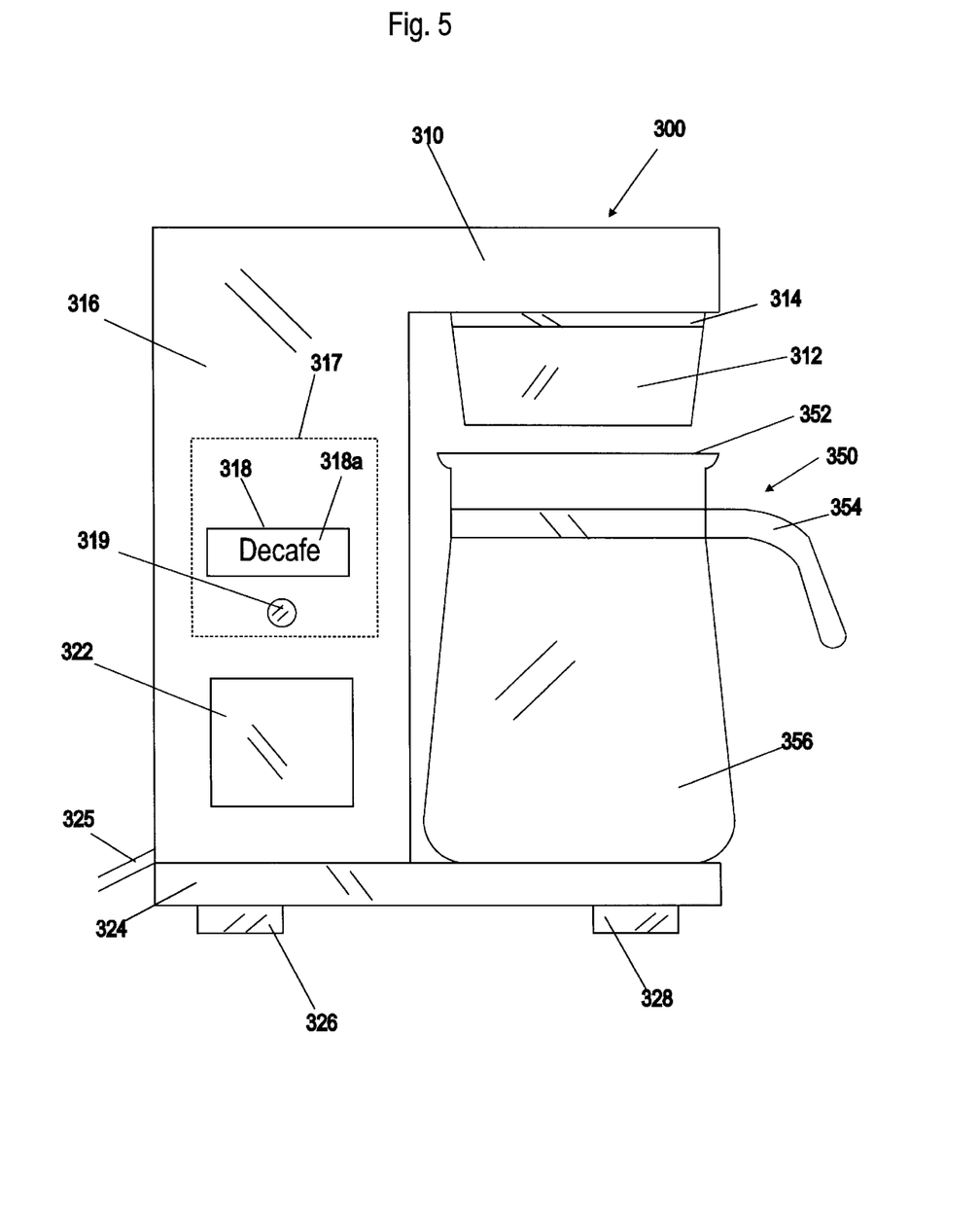
FIG. 5 shows a coffee machine in accordance with another embodiment of the present invention having an indicator or display device which includes a push button and a electronic digital display to indicate whether coffee which has been prepared in a coffee pot is regular or decaffeinated and a coffee pot.

FIG. 5 shows a coffee machine 300 in accordance with another embodiment of the present invention having an indicator device 317 which includes a push button 319 and a electronic digital display 318 to indicate whether coffee which has been prepared in a coffee pot 350 is regular or decaffeinated. The coffee machine 300 may be identical to coffee machine 200 except for the difference between indicator device 218 and the indicator device 317. Coffee machine 300 includes an extension 310, portions 312, 314, 316, indicator device 317, control panel 322, power cord 325 (shown partially) which may be electrically connected to a power outlet, base 324, and legs 326 and 328. FIG. 5 also shows a coffee pot 350 having an opening 352 for receiving coffee from the coffee machine 300, a handle 354 and a receptacle 356 in which the coffee is stored.

An individual can set the electronic digital display 318 to a "Decaf" 318a designation as in FIG. 5 by pressing the push button 319 a certain number of times. When the push button 319 is next pressed the designation on the digital display 318 may turn to a "Coffee" designation. The push button 319 may be a toggle switch which toggles the "Decaf" and "Coffee" designations on the display 318.

Figure 6:
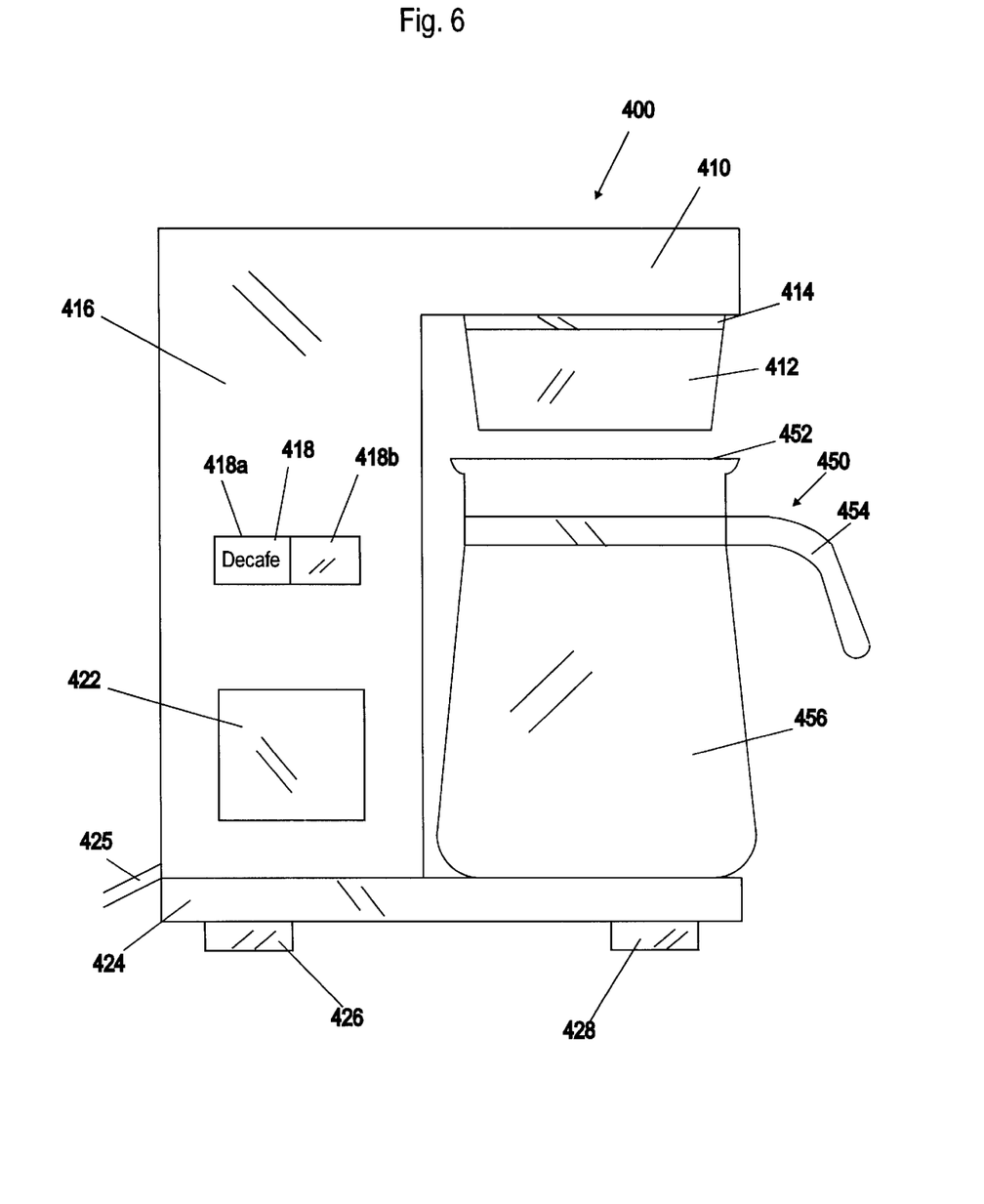
FIG. 6 shows a coffee machine in accordance with another embodiment of the present invention having an indicator or display device which includes a push button and an electronic digital display to indicate whether coffee which has been prepared in a coffee pot is regular or decaffeinated.

FIG. 6 shows a coffee machine 400 in accordance with another embodiment of the present invention having an indicator device 418. The coffee machine 400 may be identical to coffee machine 300 except for the difference between indicator device 418 and the indicator device 317.

Coffee machine 400 includes an extension 410, portions 412, 414, 416, indicator device 418, control panel 422, power cord 425 (shown partially) which may be electrically connected to a power outlet, base 424, and legs 426 and 428. FIG. 6 also shows a coffee pot 450 having an opening 452 for receiving coffee from the coffee machine 400, a handle 454 and a receptacle 456 in which the coffee is stored.

The indicator device 418 is a slide display which may be identical to the display device 20 in FIG. 1. The indicator device 418 may be provided or sold separately from the coffee machine 400. The indicator device 418 may have an adhesive backing which can be attached or detached to or from the coffee machine 400. An individual can set the indicator device 418 to show the "Decaf" designation 418*a* and to cover the "Coffee" designation with panel 418*b* or may cover the "Decaf" designation 418*a* and show the "Coffee" designation depending on the type of coffee made in coffee pot 450.

Figure 7:
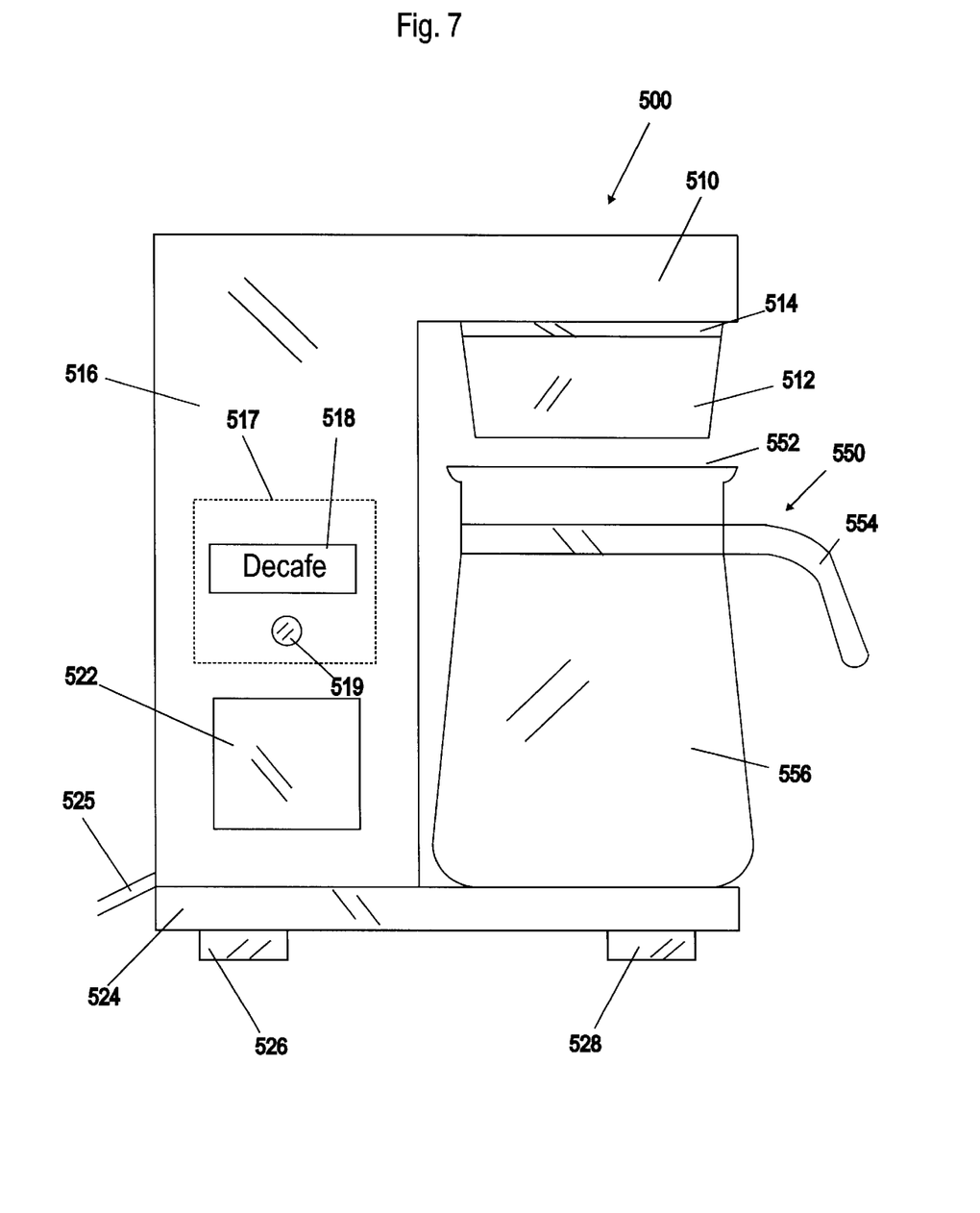
FIG. 7 shows a coffee machine in accordance with another embodiment of the present invention having an indicator or display device which includes a push button and a manual or mechanical display to indicate whether coffee which has been prepared in a coffee pot is regular or decaffeinated.

FIG. 7 shows a coffee machine 500 in accordance with another embodiment of the present invention having an indicator device 517. The coffee machine 500 may be identical to coffee machine 400 except for the difference between indicator device 517 and the indicator device 418. Coffee machine 500 includes an extension 510, portions 512, 514, 516, indicator device 517, control panel 522, power cord 525 (shown partially) which may be electrically connected to a power outlet, base 524, and legs 526 and 528. FIG. 7 also shows a coffee pot 550 having an opening 552 for receiving coffee from the coffee machine 500, a handle 554 and a receptacle 556 in which the coffee is stored.

The indicator device 517 is comprised of a display 518 which manually or mechanically changes, and a push button switch 519 for changing the mechanical display. An individual can mechanically toggle the mechanical display to show either a "Decafe" designation or a "Coffee" or "regular" designation with the switch 519 depending on the type of coffee in coffee pot 550.

Figure 8:
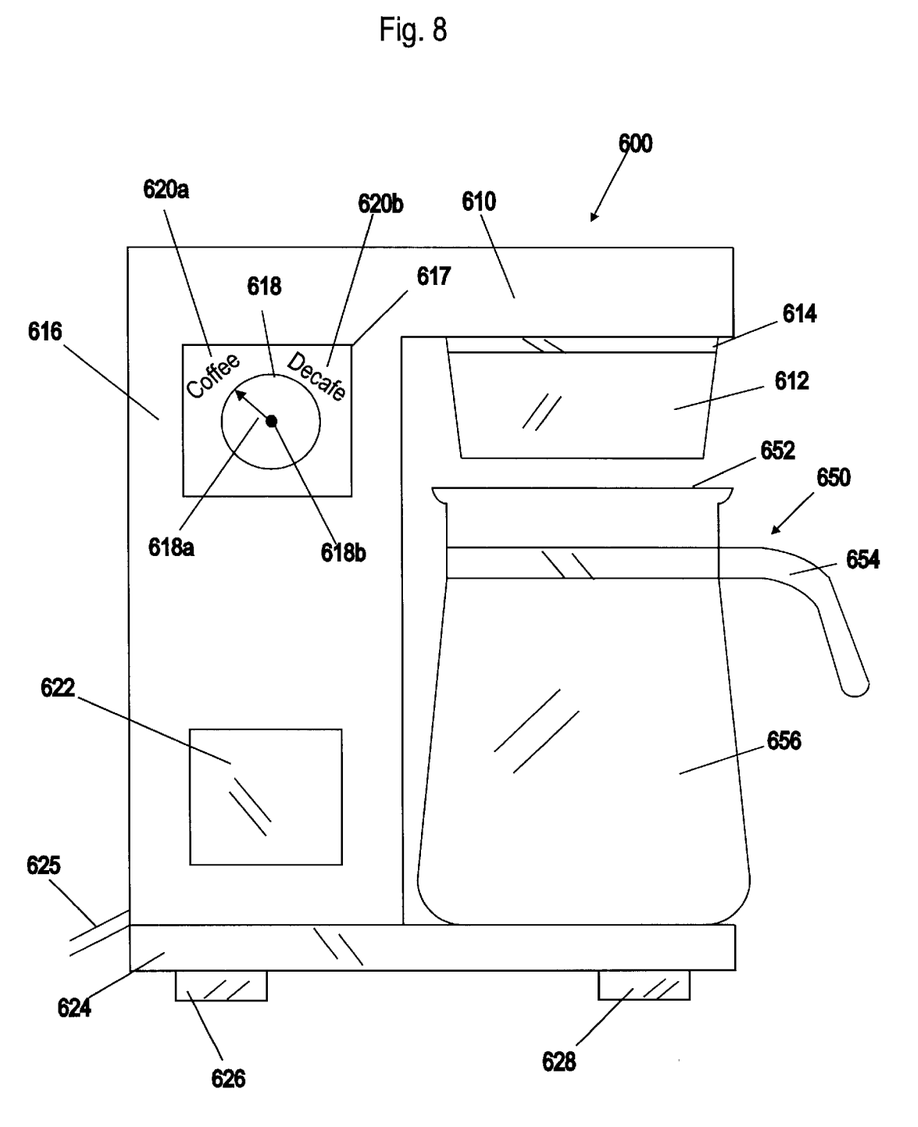
FIG. 8 shows a coffee machine in accordance with another embodiment of the present invention having an indicator or display device which includes a dial which can point to one of two designations to indicate whether coffee which has been prepared in a coffee pot is regular or decaffeinated.

FIG. 8 shows a coffee machine 600 in accordance with another embodiment of the present invention having an indicator device 617. The coffee machine 600 may be identical to coffee machine 500 except for the difference between indicator device 617 and the indicator device 517. Coffee machine 600 includes an extension 610, portions 612, 614, 616, indicator device 617, control panel 622, power cord 625 (shown partially) which may be electrically connected to a power outlet, base 624, and legs 626 and 628. FIG. 8 also shows a coffee pot 650 having an opening 652 for receiving coffee from the coffee machine 600, a handle 654 and a receptacle 656 in which the coffee is stored.

The indicator device 617 is comprised of a dial 618 which includes a pointer 618*a*, and designations 620*a* for "Coffee" and 620*b* for "Decafe". The pointer 618*a* can be rotated about pivot point 618*b* which may be a knob, and the pointer 618*a* can be set to point to either the designation 620*a* or the designation 620*b* depending on the type of coffee in coffee pot 650.

Figure 9:
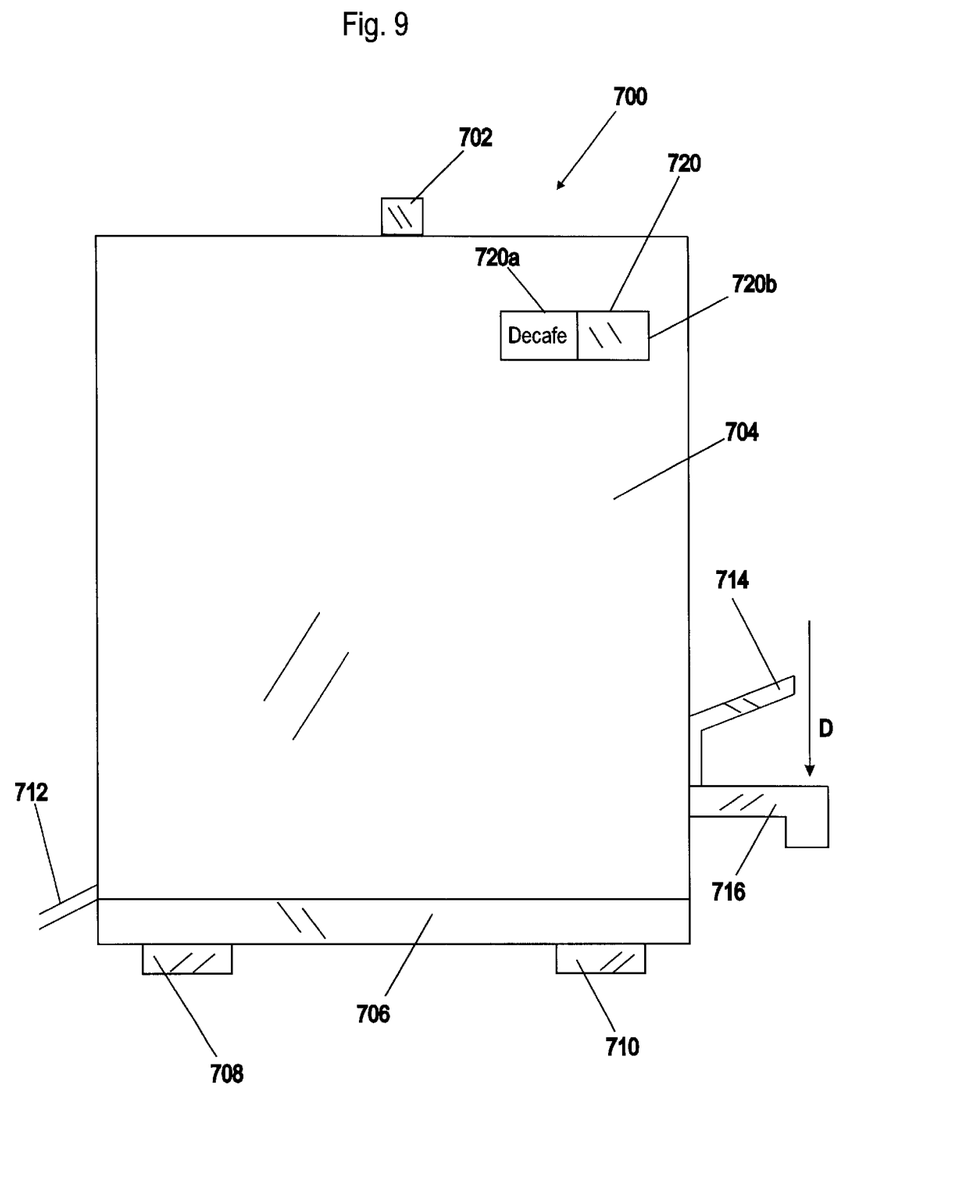
FIG. 9 shows a commercial electric coffee machine including a spigot in accordance with another embodiment of the present invention having an indicator or display device which includes a slide display to indicate whether coffee which has been prepared is regular or decaffeinated.
Figure 10:
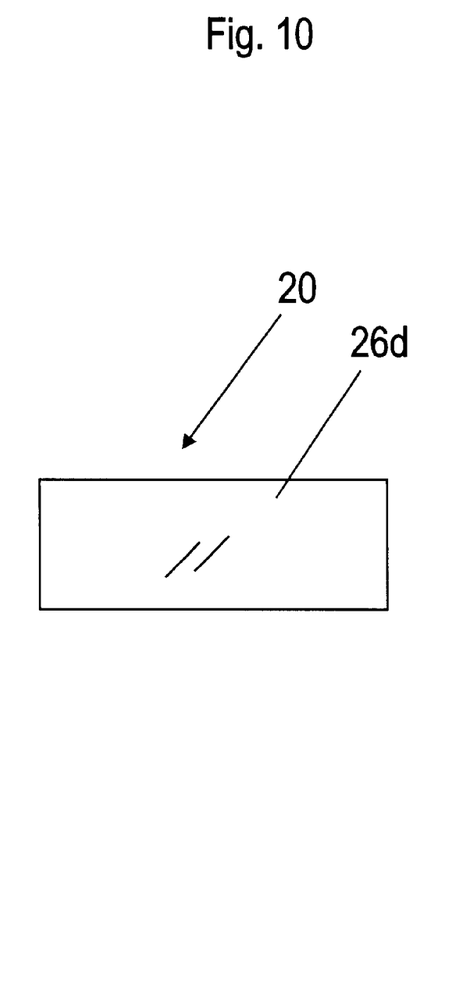
FIG. 10 shows a backing of the display device of FIG. 1, with the display device separate from any beverage pitcher.

FIG. 9 shows a commercial electric coffee machine 700 in accordance with another 7 embodiment of the present invention. The machine 700 includes receptacle 704, spigot switch 714, spigot 716, power cord 712 for connecting to an electrical outlet, base 706, legs 708 and 710, and display device or indicator device 720. The spigot switch 714, when pressed downwards in a direction D, allows coffee to flow from the receptacle 704 through the spigot 716 and out of the coffee machine 700. The machine 700 may be similar to those known in the art with the exception of indicator device 720. The indicator device 720 may be a slide device similar to that shown in FIG. 1 for device 20. The indicator device 720 may be provided or sold separately. The indicator device 720 may include an adhesive backing for attaching or detaching the indicator device 720 to or from the machine 700. The indicator device 720 may include a "Decafe" designation 720*a* which is shown and a "coffee" designation which is not shown. The indicator device 720 may include a panel 720*b* for covering the "coffee" designation or the "Decafe designation as appropriate. The indicator device 720 can be fixed to the receptacle 704 and part of the machine 700; and FIG. 10 shows a back side 26*d* of a backing 26 of the display device 20 of FIG. 1, with the display device 20 separate from any beverage pitcher. The back side 26*d* may be made of an adhesive material or may have an adhesive material placed thereon.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:

a display device;

wherein the display device can be placed in a first state or a second state; and wherein when the display device is placed in a first state the display device provides a first visual indication of a first type of beverage which is within a beverage pitcher;

wherein when the display device is placed in a second state the display device provides a second visual indication of a second type of beverage which is within a beverage pitcher; and wherein the first and second type of beverages differ and the first and second visual indications differ;

and wherein the display device can be attached or detached from the beverage pitcher.

2. An apparatus comprising:

a display device;

wherein the display device can be placed in a first state or a second state; and wherein when the display device is placed in a first state the display device provides a first visual indication of a first type of beverage which is within a beverage pitcher;

wherein when the display device is placed in a second state the display device provides a second visual indication of a second type of beverage which is within a beverage pitcher; and wherein the first and second type of beverages differ and the first and second visual indications differ;

and wherein the display device is comprised of a sliding member which is connected to the beverage pitcher and which can be slid to a first position to allow a first designation of the first type of beverage to be seen and which in the first position covers and prevents from being seen a second designation of the second type of beverage;

and wherein the sliding member can be slid to a second position to allow the second designation of the second type of beverage to be seen and which in the second position covers and prevents from being seen the first designation of the first type of beverage.

3. The apparatus of claim 2 wherein the first visual indication is a designation of the first type of beverage and is comprised of least one alphanumeric character; and the second visual indication is a designation of the second type of beverage and is comprised of at least one alphanumeric character.

4. The apparatus of claim 3 wherein the beverage pitcher is a coffee pot.

5. The apparatus of claim 4 wherein the first type of beverage is decaffeinated coffee; and the second type of beverage is non decaffeinated coffee.

6. An apparatus comprising:

a coffee machine which makes coffee;

wherein the coffee machine includes an indicator device;

wherein the indicator device indicates whether the coffee machine has made decaffeinated coffee or regular coffee;

wherein the indicator device comprises
   a first light under a first designation which indicates decaffeinated coffee; and
   a second light under a second designation which indicates non decaffeinated coffee;

wherein the first designation is fixed at a first location on the indicator device and the second designation is fixed at a second location on the indicator device, the first location being different from the second location;

and wherein the first light is fixed at a third location on the indicator device and the second light is fixed at a fourth location on the indicator device, the third location being different from the fourth location.

7. The apparatus of claim 6 wherein the first light is part of a first push button which can be pushed in to light the first light to indicate that decaffeinated coffee has been made; and the second light is part of a second push button which can be pushed in to light the second light to indicate that non decaffeinated coffee has been made.

8. An apparatus comprising:

a coffee machine which makes coffee;

wherein the coffee machine includes an indicator device;

wherein the indicator device indicates whether the coffee machine has made decaffeinated coffee or regular coffee;

wherein the indicator device comprises
   a first light which is able to emit either a first or a second color light;
   and wherein the first light emits the first color light when the coffee machine has made decaffeinated coffee and the first light emits the second color light when the coffee machine has made non decaffeinated coffee.

9. The apparatus of claim 8 wherein the first light is part of a first push button which can be pushed in to light the first light and to toggle the first light from emitting a first color light to emitting a second color light.

10. An apparatus comprising:

a coffee machine which makes coffee;

wherein the coffee machine includes an indicator device;

wherein the indicator device indicates whether the coffee machine has made decaffeinated coffee or regular coffee; and wherein the indicator device includes an electronic digital display which displays whether coffee which has been made by the coffee machine is non decaffeinated or decaffeinated;

and wherein the indicator device includes a first push button which when pushed in causes the electronic digital display to toggle from displaying an indication that the coffee is decaffeinated to displaying an indication that the coffee is non decaffeinated.

11. An apparatus comprising:

a coffee machine which makes coffee;

wherein the coffee machine includes an indicator device;

wherein the indicator device indicates whether the coffee machine has made decaffeinated coffee or regular coffee; and wherein the indicator device includes a sliding member;

wherein the sliding member can be placed in a first position where the sliding member allows an indication that coffee which has been made is decaffeinated to be shown but covers an indication that coffee which has been made is non decaffeinated;

and wherein the sliding member can be placed in a second position where the sliding member allows an indication that coffee which has been made is non decaffeinated to be shown but covers an indication that coffee which has been made is decaffeinated.

12. An apparatus comprising:

a coffee machine which makes coffee;

wherein the coffee machine includes an indicator device wherein the indicator device indicates whether the coffee machine has made decaffeinated coffee or regular coffee; and wherein the indicator device includes a dial having a pointer and first and second designations;

wherein the first designation provides an indication that coffee which has been made is decaffeinated and the second designation provides an indication that coffee which has been made is non decaffeinated;

and wherein the pointer can point to either the first or the second designation to indicate a type of coffee which has been made.

13. A method comprising the steps of fixing a display device onto a beverage pitcher; and wherein the display device can be placed into a first state or a second state;

wherein when the display device is placed in a first state the display device provides a first visual indication of a first type of beverage which is within the beverage pitcher;

wherein when the display device is placed in a second state the display device provides a second visual indication of a second type of beverage which is within the beverage pitcher; and wherein the first and second type of beverages differ and the first and second visual indications differ.

14. The method of claim 13 wherein the display device is comprised of a sliding member which is connected to the beverage pitcher and which can be slid to a first position to allow a first designation of the first type of beverage to be seen and which in the first position covers and prevents from being seen a second designation of the second type of beverage.

15. The method of claim 13 wherein the beverage pitcher is a coffee pot.

16. The method of claim 15 wherein the first type of beverage is decaffeinated coffee; and the second type of beverage is non decaffeinated coffee.

17. The method of claim 13 wherein the first visual indication is a designation of the first type of beverage and is comprised of least one alphanumeric character; and
the second visual indication is a designation of the second type of beverage and is comprised of at least one alphanumeric character.

18. The method of claim 17 wherein the beverage pitcher is a coffee pot.

19. The method of claim 18 wherein the first type of beverage is decaffeinated coffee; and the second type of beverage is non decaffeinated coffee.

20. The method of claim 14 wherein the first visual indication is a designation of the first type of beverage and is comprised of least one alphanumeric character; and
the second visual indication is a designation of the second type of beverage and is comprised of at least one alphanumeric character.

21. The method of claim 20 wherein the beverage pitcher is a coffee pot.

22. The method of claim 21 wherein the first type of beverage is decaffeinated coffee; and the second type of beverage is decaffeinated coffee.

* * * * *